United States Patent Office 3,458,557
Patented July 29, 1969

3,458,557
PEROXIDES AND PEROXY ESTERS AND THEIR PREPARATION IN THE PRESENCE OF TRIPHENYL PHOSPHINE OXIDE
Nicholas A. Milas, Belmont, Mass., assignor to Massachusetts Institute of Technology, Cambridge, Mass., a corporation of Massachusetts
No Drawing. Filed Dec. 9, 1965, Ser. No. 512,792
Int. Cl. C07c 73/10, 73/00; C08f 1/60
U.S. Cl. 260—453          5 Claims

ABSTRACT OF THE DISCLOSURE

Organic peroxygen compounds are prepared by reacting hydrogen peroxide or a hydroperoxide with organic chlorides or unsaturated organic compounds in the presence of triphenyl phosphine oxide. The products are useful as catalysts in the polymerization of the ethylenically unsaturated compounds.

---

This invention relates to the synthesis of organic peroxides, and in particular to a method of causing condensation and addition reactions of organic hydroperoxides.

I have discovered that reactions of the following general types may be brought about by using triphenyl phosphine oxide as a catalyst or carrier reagent.

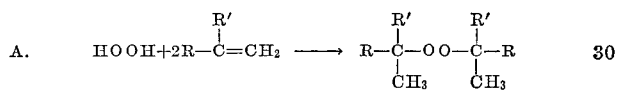

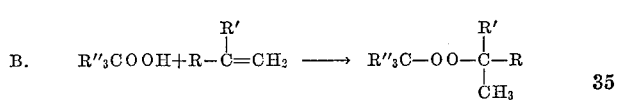

It will be apparent that this invention provides a general type of synthesis reaction for preparing many organic peroxide compounds, some of which are well known and others are novel. These compounds are generally useful as catalysts in the polymerization of vinyl esters, chlorides and other polymerizable compounds and to catalyze the cross-linking of polyethylene, polypropylene to produce valuable plastics.

The following types of reactions demonstrate the general nature of my novel processes employing triphenyl phosphine oxide as a catalyst in the synthesis of peroxides.

When triphenyl phosphine oxide is allowed to react with hydrogen peroxide, t-butyl hydroperoxide and other hydroperoxides triphenyl phosphonium peroxides are formed which can be employed to produce other peroxides and regenerate triphenyl phosphine oxide. This can be illustrated by the following equations:

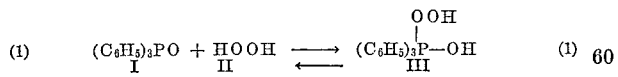

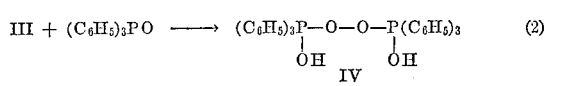

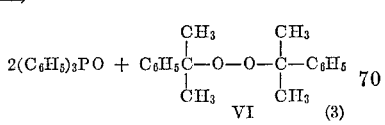

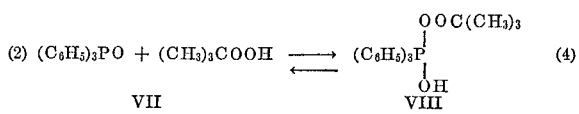

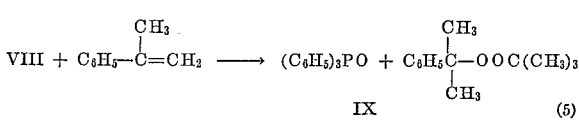

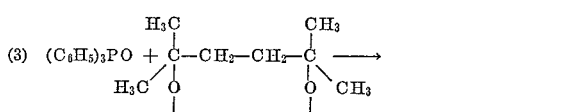

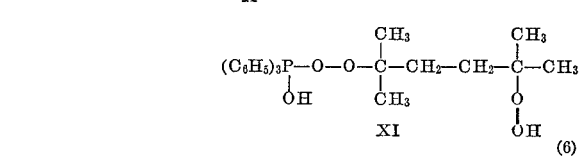

XI can be used in the same manner as IV and VIII to produce analogous peroxides.

Di-tertiary alkyl or aralkyl peroxides are produced in substantial yields when triphenyl phosphonium alkoxy or arylalkoxy chlorides are allowed to react with tertiary alkyl hydroperodixes. These reactions can be illustrated by the following equations:

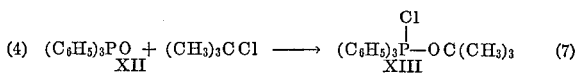

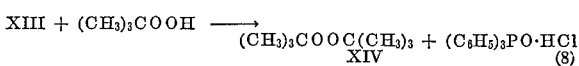

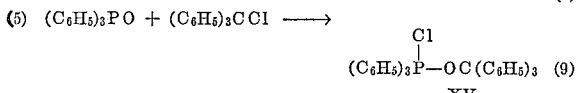

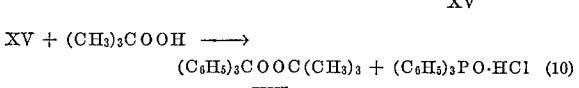
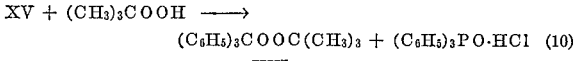
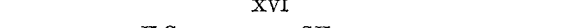
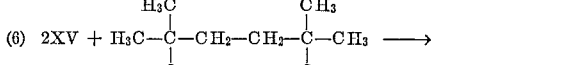

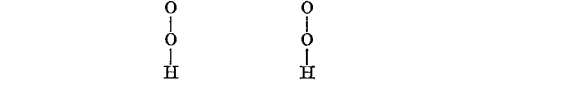

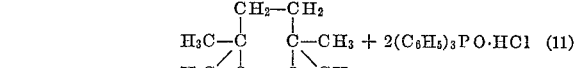

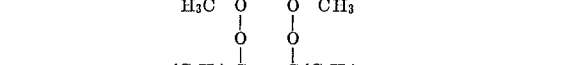

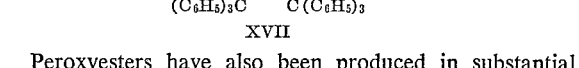

Peroxyesters have also been produced in substantial yields by allowing triphenyl phosphine oxide to react first with acid chlorides, such as acyl chlorides of lower alkyl mono, di or tri carboxylic acids then the complex formed with t-alkyl hydroperoxides. These reactions are illustrated by the following equations:

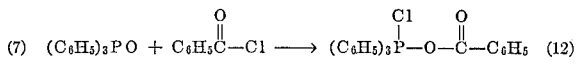

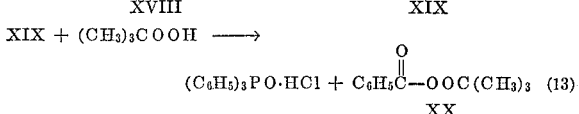
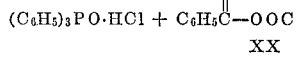

(8) 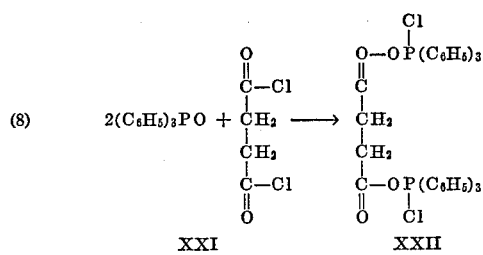 (14)

XXI  XXII

XXII + 2(CH₃)₃COOH ⟶

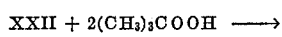

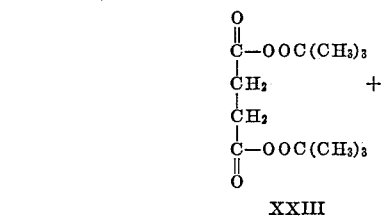

XXIII (9) 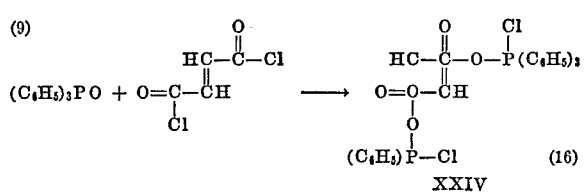 (16)

XXIV

XXIV + 2(CH₃)₃COOH ⟶

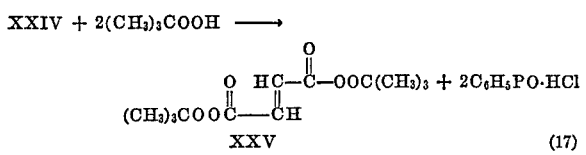 (17)

XXV

(10) 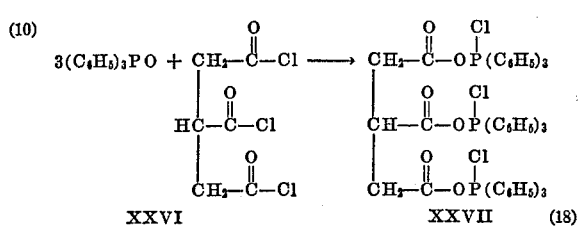 (18)

XXVI    XXVII

XXVII + 3(CH₃)₃COOH ⟶

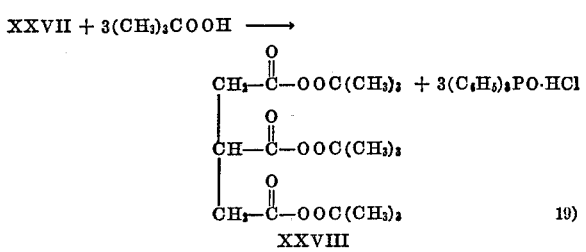 (19)

XXVIII

(11) 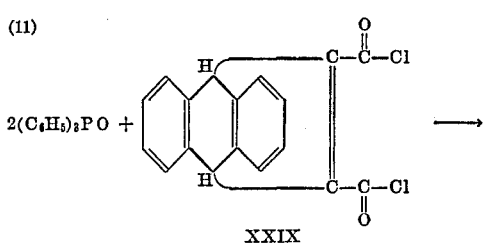

XXIX

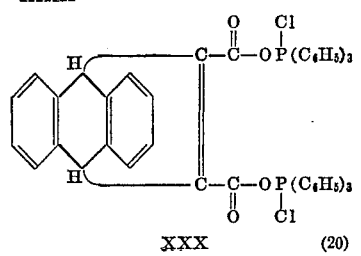

XXX (20)

XXX + 2(CH₃)₃COOH ⟶

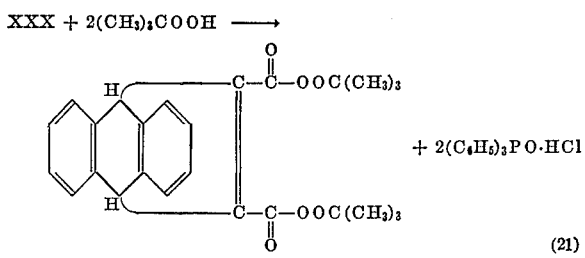 (21)

The scope of this invention will become more apparent from the specific examples illustrated below.

Example 1

*Di-cumyl peroxide.*—In a round-bottomed flask attached to a calcium chloride tube was added 10 g. of triphenyl phosphine oxide and 50 ml. of dry ether containing 5 g. of hydrogen peroxide. The mixture was shaken for about 2 hrs. at room temperature to complete the formation of the triphenyl phosphonium addition complex (III). To this was then added 34 g. of α-methyl styrene and the mixture shaken overnight. The solvents, including unreacted α-methyl styrene, were then removed under reduced pressure and the viscous residue recrystallized several times at low temperatures from 95% ethyl alcohol. A product (12 g.) was obtained, M.P. 38–40° (Lit. M.P. 39°).

Example 2

*t-Butyl cumyl peroxide.*—In a round-bottomed flask attached to a calcium chloride tube was added 5 g. of triphenyl phosphine oxide, 10 ml. of dry ether and 2 g. of 99.8% t-butyl hydroperoxide. The mixture was shaken at room temperature for about 2 hrs. to complete the formation of the triphenyl phosphonium complex (VIII). To this was added 2.2 g. of α-methyl styrene and the mixture allowed to shake overnight at room temperature. The final product was diluted with 50 ml. of pentane and the mixture extracted twice with 5% potassium hydroxide to remove the excess t-butyl hydroperoxide and to precipitate the triphenyl phosphine oxide. The non-aqueous layer was separated, dried over magnesium sulfate, filtered and the filtrate subjected to vacuum distillation to remove the volatile products. A viscous residue (2.6 g.) remained which failed to crystallize but its infrared spectrum showed characteristic bands attributed to t-butyl, peroxy and benzyl groups. Since it was peroxidic, it was concluded to be t-butyl, α,α-dimethyl benzyl peroxide.

Example 3

*Triphenyl phosphonium peroxide complex (XI).*—One gram of triphenyl phosphine oxide was dissolved in 20 ml. of anhydrous ether and to the solution was added 1.6 g. of 2,5-dimethyl-2,5-dihydroperoxyhexane and the solution allowed to stand at room temperature overnight. Crystals separated which were removed and dried in a vacuum desiccator over phosphorous pentoxide; yield, 2 g.; M.P. 79–80°.

*Analysis.*—Calcd. for $C_{26}H_{33}PO_5$: C, 68.40; H, 7.29; (O), 7.02. Found: C, 68.63; H, 7.61; (O), 7.21.

This complex could be employed for all the reactions in which the less stable intermediates III and VIII have been employed with comparable results.

Example 4

*Di-t-butyl peroxide.*—To 6.0 g. of triphenylphosphine oxide was added excess (10 ml.) of pure t-butyl chloride. The mixture was allowed to stand at room temperature with magnetic stirring for two hrs. then to it was added 2.0 g. of 99.8% t-butyl hydroperoxide. The mixture was allowed to stir magnetically for two hrs. longer then shaken with excess (5%) potassium hydroxide and the non-aqueous layer separated, dried over magnesium sulfate and filtered. A vapor phase chomatogram of the filtrate showed the presence of di-t-butyl peroxide. The filtrate was then fractionally distilled and the fraction boiling 109–110° collected; yield, 3.0 g. This gave an infrared spectrum which was identical with that of an authentic sample of di-t-butyl peroxide.

Example 5

*t-Butyl triphenylmethyl peroxide.*—To 2 g. of triphenylchloromethane in 10 ml. of dry chloroform was added at room temperature with magnetic stirring 2 g. of triphenylphosphine oxide. The reaction mixture was allowed to stir for 2 hrs. at room temperature then to it was added 0.7 g. of pure t-butyl hydroperoxide in 10 ml. of dry chloroform. The reaction was then allowed to stir overnight at room temperature the chloroform layer separated, dried over magnesium sulfate, filtered and the chloroform removed in vacuum. The crude residue (3 g.) was recrystallized from methyl alcohol. A product was obtained (2.2 g.) which melted at 68–70° (Lit. M.P. 72–73°). A mixed M.P. with an authentic sample of t-butyl triphenylmethyl peroxide gave no depression.

Example 6

*2,5-dimethylhexan - 2,5 - di - (triphenylmethyl) peroxides.*—To 75 ml. of dry toluene was added 10 g. of triphenylphosphine oxide and 10.1 g. of triphenylchloromethane. The mixture was shaken for two hrs. at room temperature then 3.2 g. of 2,5-dimethyl-2,5-dihydroperoxyhexane was added to it and the mixture allowed to shake overnight at room temperature. The solid products had gone completely into solution. The toluene solution was then diluted with 150 ml. of dry ether and the mixture shaken with 5% solution of potassium hydroxide. The non-aqueous layer was separated, dried over magnesium sulfate, filtered and the low boiling solvents including toluene removed under reduced pressure. The solid residue was then extracted with hot acetone which removed all of the triphenylphosphine oxide but not the organic peroxide. The amorphous solid peroxide was recrystallized from hot ligroin and the crystals (10.0 g.; yield 90%) separated had a M.P. of 160–162° (Lit. M.P. 162–163°). A mixed M.P. with an authentic sample of this peroxide gave no depression.

Example 7

*t-Butyl peroxybenzoate.*—To 4 g. of triphenylphosphine oxide was added 10 ml. of dry benzene and 2 g. of benzoyl chloride. The mixture was protected with a calcium chloride tube and heated to boiling for one-half hour, then allowed to stand for several hrs. to cool to room temperature. t-Butyl hydroperoxide (98.2%; 1.5 g.) was then added and the mixture allowed to shake over-night at room temperature. Anhydrous ether (50 ml.) was then added and the resulting solution shaken with 5% potassium hydroxide. The non-aqueous layer was separated, dried over magnesium sulfate and filtered. The solvents were removed under reduced pressure and the residual oil (2.2 g.) collected and analyzed. An IR spectrum of the oil between sodium chloride plates showed a strong band at 1760 cm.$^{-1}$ attributed to t-butyl peroxybenzoate and the OH band of the t-butyl hydroperoxide was completely absent.

*Analysis.*—Calcd. for $C_{11}H_{14}O_3$: (O), 8.25. Found: (O), 8.00.

These properties show the oil to be t-butyl peroxybenzoate.

Example 8

*Di-t-butyl diperoxysuccinate.*—A mixture of 30 ml. of dry benzene, 7.2 g. of triphenylphosphine oxide and 2 g. of succinyl chloride was shaken under anhydrous conditions at room temperature for 2 hrs. then 2.4 g. of pure t-butyl hydroperoxide was added. The mixture was then shaken overnight at the same temperature, then diluted with 100 ml. of anhydrous ether. The resulting solution was extracted with 5% potassium hydroxide to remove the unreacted t-butyl hydroperoxide and precipitate the triphenylphosphine oxide. The non-aqueous layer was separated, dried over magnesium sulfate and filtered. The solvents from the filtrate were removed under reduced pressure and the crude residue (4 g.) recrystallized from anhydrous ether; yield, 3.0 g. M.P. 53° (Lit. M.P. 53–54°). A mixed M.P. with an authentic sample showed no depression.

Example 9

*Di-t-butyl diperoxyfumarate.*—To 50 ml. of dry toluene was added 7.3 g. of triphenylphosphine oxide and 2 g. of fumaryl chloride. The mixture was shaken under anhydrous conditions at room temperature for 2 hrs. then to it was added 2.4 g. of 99.8% t-butyl hydroperoxide and again shaken overnight under the same conditions. It was then diluted with 100 ml. of anhydrous ether and the resulting solution extracted with 5% potassium hydroxide. The non-aqueous layer was separated, dried over magnesium sulfate and filtered. The solvents including the toluene were removed under reduced pressure and the viscous residue (3.5 g.) recrystallized from petroleum ether; M.P. 35°.

*Analysis.*—Calcd. for $C_{12}H_{20}O_6$: C, 55.43; H, 7.75; (O), 12.2. Found: C, 55.26; H, 7.71; (O), 12.0.

An infrared spectrum of the product showed prominent bands at 1760–1780 and at 855 cm.$^{-1}$ respectively due to the peroxyester groups.

This compound is useful as a cross linking catalyst for resins such as vinyl resins, styrene, and acrylics.

Example 10

*Tri-t-butyl triperoxycarballylate.*—A mixture of 50 ml. of dry benzene, 7.21 g. of triphenylphosphine oxide and 2 g. of tricarballylic chloride (XXVI) was shaken under anhydrous conditions at room temperature for 2 hrs. then to it was added 2.5 g. of 99.8% t-butyl hydroperoxide. The mixture was shaken under the same conditions overnight, then diluted with 100 ml. of anhydrous ether, and extracted with 5% potassium hydroxide to remove the excess t-butyl hydroperoxide and precipitate the triphenylphosphine oxide. The non-aqueous layer was separated, dried over magnesium sulfate, filtered and the solvents removed under reduced pressure. A residue (5.5 g.) remained. This was recrystallized at low temperatures from pentane; yield of colorless crystals, 2.6 g., M.P. 49–51°.

*Analysis.*—Calcd. for $C_{18}H_{32}O_9$: C, 55.08; H, 8.22; (O), 12.25. Found: C, 55.34; H, 8.40; (O), 12.27.

An infrared spectrum of this tri-peroxyester showed strong bands in the region of 1780 cm.$^{-1}$ attributed to the peroxyester groups.

This compound is useful as a cross linking catalyst for resins such as vinyl resins, styrene, and acrylics.

Example 11

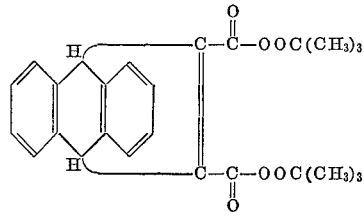

A mixture of 50 ml. of dry benzene, 5.1 g. of triphenylphosphine oxide and 3 g. of the acid chloride (XXIX), prepared as described by Diels and Alder, Ann, vol. 486, p. 191 (1931), was shaken at room temperature under anhydrous conditions for 2 hrs. To the reaction product was then added 1.8 g. of 99.8% t-butyl hydroperoxide and the final mixture shaken overnight under the same conditions. One hundred ml. of dry ether was then added and the mixture extracted with 5% potassium hydroxide to remove the excess t-butyl hydroperoxide and to precipitate the triphenylphosphine oxide. The non-aqueous layer was dried over magnesium sulfate, filtered and the solvents removed under reduced pressure. A yellowish solid residue (4 g.) remained. This was recrystallized from benzene-cyclohexane mixture (1:1), M.P. 153–154°.

*Analysis.*—Calcd. for $C_{26}H_{28}O_6$ (XXXI): C, 71.54; H, 6.47; (O), 7.93. Found: C, 71.36; H, 6.73; (O), 7.85.

An infrared spectrum of this diperoxyester showed strong bands at 1750–1780 cm.$^{-1}$ which are attributed to the peroxyester groups. This peroxyester has also been tested for cross-linking properties on polyester resins and was found to be very good in a comparison with tertiary butyl peroxy benzoate.

Although this invention has been described with reference to the use of triphenyl phosphine oxide as a carrier or catalyst, it is known that other organic phosphine oxides generally react the same as the triphenyl compound, and it is expected that others, such as tributyl phosphine oxide, triethyl phosphine oxide and triphenoxyphosphine oxide may also be employed in the reaction, in place of the triphenyl compound.

Having thus described my invention, I claim and desire to secure by Letters Patent, the following.

1. Tri-t-butyl triperoxy carballylate.
2. A peroxy ester of the formula

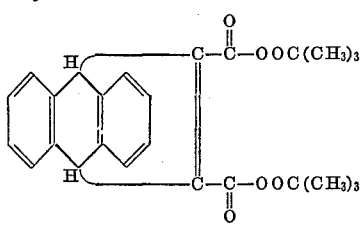

3. The method of synthesizing peroxides and peroxy esters by reacting (a) a compound selected from the group consisting of hydrogen peroxide, and mono and di-t-lower alkyl hydroperoxides with
(b) a compound selected from the group consisting of alphamethyl styrene, t-lower alkyl chlorides, triphenyl chloromethane, acyl chlorides of lower alkyl mono, di, or tri carboxylic acids and benzoyl chloride, which comprises mixing one of either (a) or (b) with triphenylphosphine oxide and allowing a reaction to take place to produce an intermediate reaction product, then combining said intermediate reaction product with the other reactant (a) or (b) and allowing a further reaction to take place wherein the synthesized peroxide or peroxy ester is formed and triphenylphosphine oxide or its hydrochloride is reformed.

4. The method defined by claim 3 wherein (a) is first combined with a triphenylphosphine oxide and the reaction product is combined with the alphamethyl styrene.

5. The method defined by claim 3 wherein one of said chlorides is combined with the triphenylphosphine oxide and the reaction product is combined with (a).

References Cited

Yurzhenko et al.: Journal of Organic Chemistry of the USSR, volume 1, No. 4, pp. 689–691 (4–1965).

CHARLES B. PARKER, Primary Examiner

S. T. LAWRENCE III, Assistant Examiner

U.S. Cl. X.R.

260—89.5, 92.8, 93.5, 93.7, 94.9, 606.5, 610